United States Patent [19]
Puster et al.

[11] 3,844,442
[45] Oct. 29, 1974

[54] GAGE CONSTRUCTION AND PARTS THEREFOR OR THE LIKE

[75] Inventors: Louis M. Puster; Larry V. Price, both of Knoxville, Tenn.

[73] Assignee: Robertshaw Controls Company, Richmond, Va.

[22] Filed: Sept. 20, 1972

[21] Appl. No.: 290,477

[52] U.S. Cl............ 220/82 A, 73/431, 220/55 AN
[51] Int. Cl..................... B65d 25/54, G01d 11/26
[58] Field of Search........ 73/431; 220/82 A, 55 AN; 285/DIG. 18; 277/32

[56] References Cited
UNITED STATES PATENTS

| | | | |
|---|---|---|---|
| 1,366,214 | 1/1921 | Ritz-Woller | 73/431 |
| 2,215,537 | 9/1940 | Bjong | 73/431 |
| 2,294,175 | 8/1942 | Graesser et al. | 73/431 X |
| 2,332,458 | 10/1943 | Muney et al. | 220/55 AN |
| 2,335,063 | 11/1943 | Hopkins | 73/431 |
| 2,379,053 | 6/1945 | Weingart | 220/55 AN |
| 2,596,045 | 5/1952 | Rogallo | 220/46 PX |
| 2,697,242 | 12/1954 | Elowson et al. | 73/431 X |
| 2,861,712 | 11/1958 | Bermingham | 220/55 AN |
| 3,000,345 | 9/1961 | Gray, Jr. et al. | 220/82 R |
| 3,143,885 | 8/1964 | Waite et al. | 73/431 |

Primary Examiner—Richard C. Queisser
Assistant Examiner—Daniel M. Yasich
Attorney, Agent, or Firm—Candor, Candor & Tassone

[57] ABSTRACT

An instrument casing having an opening therein exposing a pointer and a dial therefor. A flexible sealing member is carried by the casing adjacent the opening thereof. A lens is disposed in the opening and is provided with an outer periphery that is disposed against the sealing member. A lens ring is disposed against the other side of the outer periphery of the lens to hold the lens in the casing opening. The lens ring has an interlocking part thereof disposed against the outer peripheral edge of the lens between the sides thereof to lock the lens ring to the casing and, thus, the lens in the casing opening. A separate annular spacing member is disposed in the casing opening against the end wall thereof to hold the sealing member in spaced relation from the dial plate.

8 Claims, 7 Drawing Figures

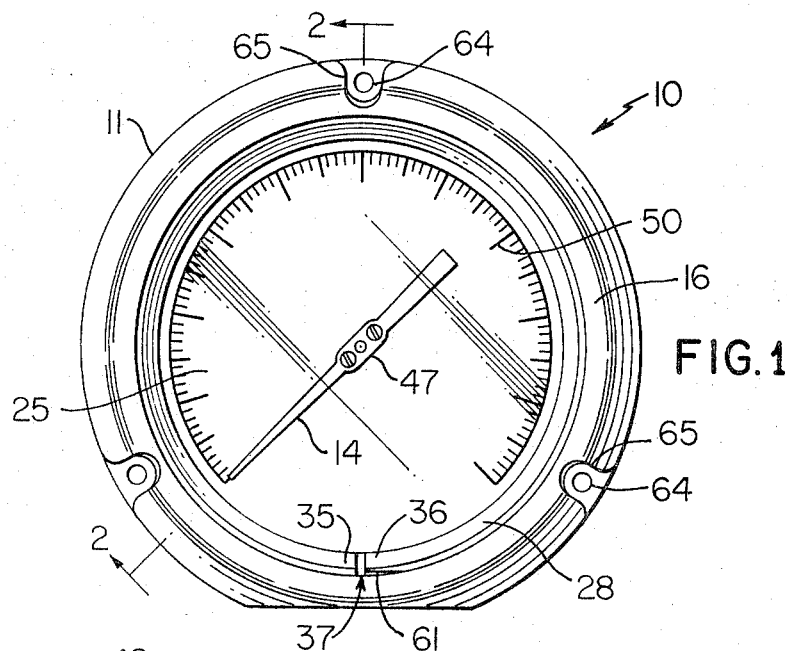
FIG. 1
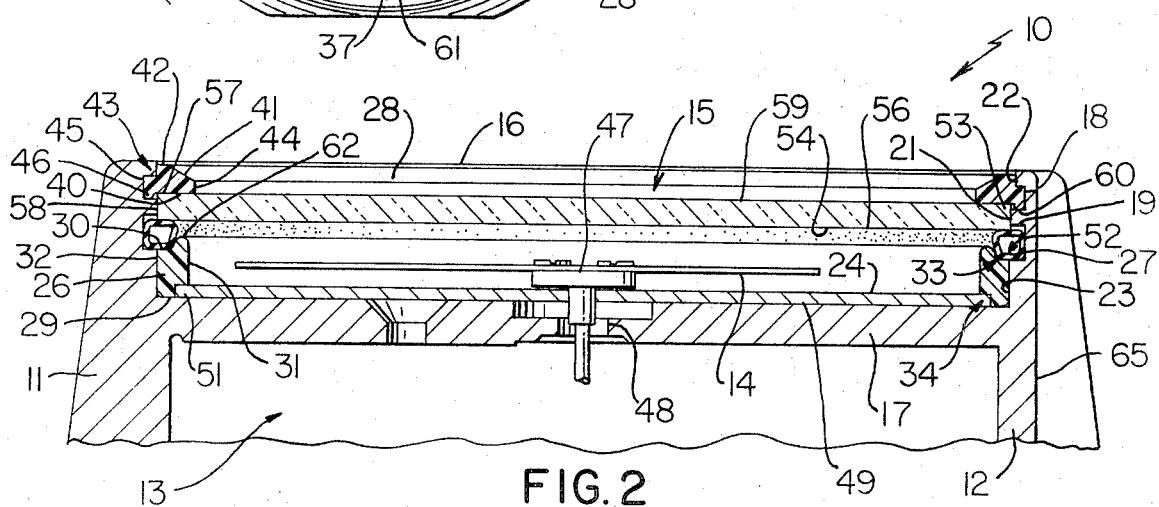
FIG. 2
FIG. 3
FIG. 4

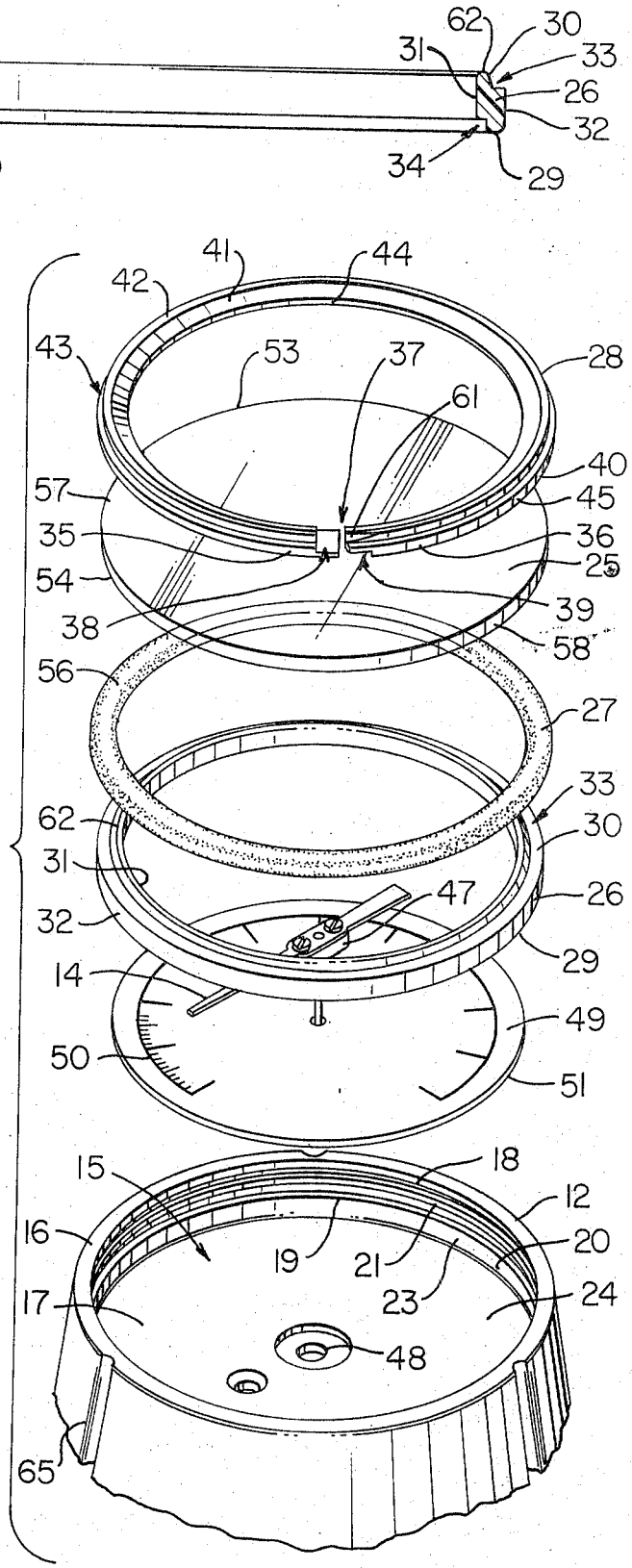

3,844,442

GAGE CONSTRUCTION AND PARTS THEREFOR OR THE LIKE

This invention relates to an improved gage construction or the like as well as to improved parts for such a gage construction or the like.

It is well known that instrument casings have been provided wherein an opening in the casing exposes a dial and pointer arrangement for indicating the particular condition being sensed by the instrument, such as in a presurre gage construction or the like. It is also well known that such opening in the casing is closed by a lens to not only protect the dial and pointer arrangement, but also to seal closed the casing opening for safety purposes, such as in connection with a pressure gage and the like.

Accordingly, it is a feature of this invention to provide an improved means for holding and securing the lens in the opening of the casing of an instrument or the like.

Another feature of this invention is to provide an improved lens ring means for locking the lens in the opening of an instrument casing.

Another feature of this invention is to provide an improved spacing means for spacing the lens in the opening of an instrument casing or the like.

In particular, one embodiment of this invention provides an instrument casing having an opening therein. A flexible sealing member is carried by the casing adjacent the opening thereof. A lens is disposed in the opening and has one side of its outer periphery disposed against the sealing member. A lens ring means is disposed against the other side of the outer periphery of the lens to hold the lens in the opening. The lens ring means has an interlocking part thereof disposed against the outer peripheral edge means of the lens between the opposed sides thereof to lock the lens ring means to the casing and, thus, the lens to the casing. A separate spacing member is disposed in the opening and has one side thereof abutting an end wall means of the casing that closes the opening thereof. The other side of the spacing member engages the sealing member to position the same above the end wall.

Accordingly, it is an object of this invention to provide an improved gage construction or the like having one or more of the novel features set forth above or hereinafter shown or described.

Another object of this invention is to provide an improved lens ring means for a gage construction or the like.

Another object of this invention is to provide an improved spacing means for the lens of a gage construction or the like.

Other objects, uses and advantages of this invention are apparent from reading of this description which proceeds with reference to the accompanying drawings forming a part thereof and wherein:

FIG. 1 is a front view of an improved gage construction of this invention.

FIG. 2 is a fragmentary, cross-section view taken on line 2—2 of FIG. 1.

FIG. 3 is a front view of the improved lens ring means of this invention before installation thereof.

FIG. 4 is an enlarged, fragmentary, side view of the opposed ends of the lens ring means of FIG. 3 and is taken substantially in a direction of the arrows 4—4 of FIG. 3.

FIG. 5 is a cross-sectional view through the improved lens spacer that is utilized in the gage construction of FIGS. 1 and 2.

FIG. 6 is a partial cross-sectional view similar to FIG. 2 and illustrates the method of inserting and removing the lens and lens ring means from the instrument casing.

FIG. 7 is an exposed perspective view of the various parts of the gage construction of FIGS. 1 and 2.

While the various features of this invention are hereinafter described and illustrated as being particularly adapted for providing the lens holding means for a gage construction or the like, it is to be understood that the various features of this invention can be utilized singly or in any combination thereof to provide a lens arrangement for any other type of device as desired.

Therefore, this invention is not to be limited to only the embodiment illustrated in the drawings, because the drawings are merely utilized to illustrate one of the wide variety of uses of this invention.

Referring now to FIGS. 1 and 2, an improved gage construction of this invention is generally indicated by the reference numeral 10 and comprises an instrument casing 11 having a body portion 12 provided with a chamber 13 therein for receiving conventional motion transmitting means that is adapted to operate and move a rotatably mounted pointer 14 in response to a sensed condition in a manner well known in the art whereby such motion transmitting means need not be illustrated nor further described.

The instrument casing 11 has an opening 15 formed therein and interrupting an end surface 16 thereof, the opening 15 being substantially circular and cylindrical and defining a substantially flat circular end wall 17 closing off the opening 15 and separating the same from the motion transmitting chamber 13. The opening 15 is formed in such a manner that the same defines a pair of annular grooves 18 and 19 in the internal peripheral sidewall 20 of the casing 11 that defines the cylindrical opening 15.

The annular grooves 18 and 19 are formed in such a manner that the same define an outwardly directed annular shoulder 21 therebetween, an outwardly directed annular shoulder 22 adjacent the end surface 16 of the casing 11 and an annular shoulder 23 between the groove 19 and the upper flat surface 24 of the end wall 17.

The lens closing arrangement for the opening 15 of the casing 11 of this invention comprises a transparent, disc-like lens 25, a separate annular spacing member 26, a compressible sealing member 27 and an annular lens ring means 28.

The annular spacing member 26 is best illustrated in FIG. 5 and can be formed of molded plastic material or other suitable material having the cross-sectional configuration illustrated wherein the annular spacing member 26 has opposed sides or ends 29 and 30 and a substantially cylindrically shaped internal peripheral surface 31 and a substantially cylindrically shaped external peripheral surface 32. The upper end surface 30 is provided with an annular recess 33 at the outer peripheral edge thereof whereas the lower end surface 29 is provided with an annular recess 34 at the inner peripheral edge thereof.

The annular lens ring means 28 as illustrated in FIGS. 2, 3 and 4 comprises a split member having ends 35 and 36 that define a split 37 therebetween, the ends 35 and 36 respectively provided with cut-out portions 38 and 39 which will permit the ends 35 and 36 to be moved toward each other in overlapping relation without increasing the thickness of the annular ring means 28 at the split 37 thereof.

The annular lens ring means 28 has a cross-sectional configuration to define a lower flat surface 40 thereof and an upper beveled surface 41 that joins with an annular top flat surface 42 that is interrupted at the outer peripheral edge thereof by an annular recess 43. The annular lens ring means 28 has a substantially cylindrically shaped internal peripheral side 44 and a substantially cylindrically shpaed outer peripheral side 45. A depending annular locking bead 46 extends from the lower surface 40 of the annular lens ring means 28 adjacent the outer peripheral edge thereof for a purpose hereinafter described.

The pointer 14 for the gage construction 10 has a central hub portion 47 for rotatably mounting the pointer 14 in a central opening 48 of the end wall 17.

A dial plate 49 is disposed about the hub 47 of the pointer 14 and can engage against the top surface 24 of the end wall 17 in the manner illustrated in FIG. 2 or be spaced above the same while being carried on the hub 47 as desired, the dial plate having suitable markings 50 thereon in the manner illustrated in FIG. 1 in a conventional manner whereby the movement of the pointer 14 relative to the markings 50 provides a visual indication through the lens 25 as to the condition being sensed by the gage construction 10 or the like.

The method of utilizing the spacer 26, sealing member 27, lens 25 and lens locking ring means 28 of this invention will now be described.

After the instrument casing 11 has been provided with the pointer and dial arrangement 14, 49, the annular spacer 26 is slipped through the opening 15 so that the lower side 29 thereof rests against the upper surface 24 of the end wall 17, the recess 34 in the inner peripheral edge thereof receiving the outer peripheral edge 51 of the dial plate 49 as illustrated. Since the spacer 26 is not an integral part of the casing 11 and is disposed in the opening 15 after the dial plate 49 has been disposed in place, it can be seen that the diameter of the dial plate 49 can be larger than if the spacer 26 was an integral part of the casing 11 where the dial plate 49 would have to have clearance in order to pass through the internal peripheral surface 31 of the spacer 26. This clearance requirement is eliminated by the use of a dial plate 49 having a diameter larger than the inside diameter of the spacer 26 at the surface 31 thereof whereby the spacer 26 covers the outer unused portion of the dial plate 49 as illustrated in FIGS. 1 and 2.

With the spacer 26 now in place, it can be seen that the recess 33 in the upper outer peripheral edge thereof cooperates with the groove 19 to define a pocket or recess means 52 in which the annular sealing member 27 can be placed as illustrated in FIG. 2. Thus, the sealing member 27 is disposed in a relatively large or wide recess 52 so that the sealing member 27 can be formed of readily deformable and resilient material for the purpose hereinafter described.

After the sealing member or gasket 27 has been disposed in the recess 52 in the manner illustrated in FIG. 2, the lens 25 is slipped through the opening 15 so as to have the outer peripheral portion 53 of the lower side 54 thereof rest against the upper surface 56 of the sealing member 27 as illustrated. Without any downward force on the lens 25, the natural resiliency of the sealing member 27 is to position the lens 25 relative to the annular shoulder 21 in such a manner that the upper part 57 of the side edge means or outer peripheral surface 58 of the lens 25 closes off the lower part of the groove 18 as illustrated in FIG. 2.

After the lens 25 has been placed in the opening 15, the lens ring means 28 which is molded with a normally slightly larger diameter than the opening 15 of the case 11 at the shoulder 22 thereof is laid against the upper surface 59 of the lens 25 with the split 37 being located at what will be the bottom of the casing 11 in the manner illustrated in FIG. 1. Beginning with the end 35 of the lens ring means 28, and by pressing on the upper surface 59 of the lens 25 so as to depress the rubber gasket 27 and thereby permit the upper surface 59 of the lens 25 to become parallel with the lower edge 60 that defines the bottom of the groove 18, the lens ring means 28 is pressed outwardly into the groove 18 and the bead 46 on the lens ring means 28 passes over the outer peripheral edge 58 of the lens 25 and snaps into place allowing the lens 25 and gasket 27 to take their final position as illustrated in FIG. 2 by the gasket reexpanding and locking the lens ring means 28 in place with the recess 43 thereof receiving the shoulder 22 of the casing 11 as well as locking the lens 25 in the opening 15 of the casing 11.

As the lens ring means 28 is being disposed in the groove 18, its original larger diameter tends to hold the lens ring means 28 more securely in the groove 18 of the casing 11 and the gap or split 37 between the ends 35 and 36 thereof remains even though the ends 35 and 36 are now disposed in overlapping relation to compensate for temperature variations when the casing 11 has a different coefficient of expansion and contraction than the ring means 28. However, the gap or split 37 is of minimum though sufficient width when the one end 36 of the lens ring means 28 overlaps the other end 35 in the manner illustrated in FIG. 1 so that the lens 25 is not visible through the gap 37 when viewing the front of the gage 10.

Thus, it can be seen that the annular bead 46 on the lens ring means 28 locks the ring means 28 into the cavity formed by the upper part 57 of the lens edge outer peripheral surface 58 in its closing off of the lower part of the groove 18 so that the lens ring means 28 cannot be dislodged by variation, shock, temperature vibration, etc., once the lens ring means 28 has been installed.

However, removal of the lens ring means 28 is accomplished in reverse order of installation thereof by prying with a screwdriver or similar tool between the ring means 28 and casing 11. The initial installation of such screwdriver is made easier by a chamfer 61 on the end 36 of the ring means 28 which overlaps the other end 35. Thus, by again pressing against the lens 25 to depress the gasket means 27 removal of the lens ring means 28 is easier and reduces wear on the bead 46 which locks the ring means 28 in place.

It can also be seen that by making the spacing member 26 as a separate member in the casing 11 rather than an integral part thereof, the machining of the groove 19 in the casing 11 is simplified because the need to get around the upper bead 62 on the spacer 26 to machine the groove 19 is eliminated and still a large recess 52 is provided for the sealing member 27. Thus, a more economical machining of the casing 11 is provided by having the spacer 26 separate from the casing 11.

Also, since the use of space in the radial direction of the casing 11 is limited by the diameter on which the three casing mounting holes 64 are located and the clearance 65 around these holes 64 are fixed by gage standards, and since the cavity 52 for the gasket 27 should be reasonably large to permit use of a resilient gasket material with a wide range of compression to make tolerance on compression less critical and to accomodate the wide ranges of lens thicknesses which exists with single strength glass, double strength glass, safety glass, etc., and to permit the installation of reasonably large locking bead 46 on the lens ring means 28, and since the visible portion of the dial plate 49 can be as large as possible to increase readability thereof, the forming of the spacer 26 as a separate part from the casing 11 eliminates any problem with space limitations.

In many situations, a manufacturer's dial diameter of the plate 49 has already been established to be larger than the desired inside diameter of the spacer 26 and to continue use of that dial size without the separate spacer 26 would require that the inside diameter of the spacer 26 be larger and, thereby, reduce the size of the gasket 27.

Also, by having the spacer 26 separate from the casing 11, the dial warpage problem is eliminated, warpage normally being a particular problem of laminated dial plates 49 commonly utilized in gages. To limit such warpage, the bottom of the spacer 26 can bear against the end wall 17 of the casing 11 with some clearance between the spacer 26 and the top of the dial 49 or the spacer 26 may bear against the top of the dial 49 with some clearance at the bottom of the spacer 26 from the end wall 17. During installation of the lens ring means 28, the compression force developed in the gasket 27 acts downwardly on the spacer 26 and easily seats the spacer 26 against the end wall 17 of the casing to overcome any warpage in the dial plate 49.

If desired, the spacer 26 can be of a different color from the casing 11. For example, a white color reflects the light on the dial 49 for easier readability and also appears as an extension of the usually white background of the dial plate 49. A white liner located similar to the spacer 26 has been used before for this purpose.

Also, by utilizing the spacer 26, an indicator such as a stationary dial pointer could be mounted on the spacer 26 of this invention and would be easily adjusted by rotating the spacer 26. The spacer 26 could also be used to hold in place a reflector ring which serves as a background outside of the dial score line on test gages and the like.

It is also possible that the bead 62 on the spacer 26 could be reshaped to be a flexible, resilient configuration if the spacer 26 were molded of flexible plastic material or the entire spacer 26 could be made of resilient material such as rubber or the like. In this manner, the spacer 26 could seal against the lens 25 and thereby eliminate the gasket 27 if desired.

Therefore, it can be seen that this invention not only provides an improved instrument construction or the like, but also this invention provides an improved lens ring means as well as an improved spacer means for the lens for an instrument casing or the like.

While the form of the invention now preferred has been disclosed and described as required by the Patent Statutes, it is to be understood that other forms may be utilized and all come within the scope of the appended claims.

What is claimed is:

1. In combination, a casing, as for instruments and the like having an opening therein and an annular groove outboard of said opening and intersecting with said opening towards one end of the casing to define parts of said opening or opposite sides of said groove, a flexible and hollow sealing member carried by said casing adjacent one of said parts of said opening thereof, a lens disposed in said opening and having opposed sides spaced from each other by an outer peripheral surface that has a portion thereof disposed adjacent said one part of said opening and another portion thereof that closes part of said groove from intersecting with said opening, said lens having one of said sides thereof disposed against said sealing member and having the other of said sides thereof exposed at said opening, a lens ring means disposed against said other side of said lens to hold said lens in said opening, said lens ring means having an interlocking part thereof disposed in said annular grooves adjacent said outer peripheral surface of said lens and extending from said other side of said lens to a point intermediate said opposed sides thereof, said lens ring means having another part thereof engaging said casing at another part of said opening at said one end of the casing whereby said lens ring means is locked to said casing, and a spacing member being disposed near said one part of said opening to be carried by said casing, said sealing member engaging said spacing member and being disposed between said spacing member and said lens, said spacing member having a part that cooperates with a portion of said part of said opening of said casing to define a groove means that receives and supports said sealing member therein.

2. A combination as set forth in claim 1 wherein said lens ring means has said interlocking part thereof substantially filling said groove.

3. A combination as set forth in claim 2 wherein said sealing member is compressible to permit said lens to uncover said part of said groove so that said lens ring means can be unlocked from said casing.

4. A combination as set forth in claim 1 wherein said lens ring means is split.

5. A combination as set forth in claim 4 wherein said lens ring means is disposed in said opening and has a natural diameter larger than said opening.

6. A combination as set forth in claim 4 wherein said lens ring means has two ends thereof defining said split thereof, said ends being disposed in overlapping relation to tend to hide said split.

7. A combination as set forth in claim 6 wherein said two ends of said lens ring are normally disposed in spaced non-overlapping relation when said lens ring means is detached from said casing.

8. A combination as set forth in claim 1 wherein said spacing member is removable from said casing.

* * * * *